United States Patent [19]

Parker

[11] 4,332,854

[45] Jun. 1, 1982

[54] POLYPROPYLENE OIL REMOVAL STRUCTURE

[76] Inventor: James H. Parker, P.O. Box 1652, Norfolk, Va. 23501

[21] Appl. No.: 174,744

[22] Filed: Aug. 4, 1980

Related U.S. Application Data

[63] Continuation of Ser. No. 579,907, May 22, 1975, abandoned.

[51] Int. Cl.³ .............................................. E02B 15/04
[52] U.S. Cl. ..................................... 428/377; 57/201; 210/502; 210/924; 428/364
[58] Field of Search ............... 210/350, 924, 691, 693, 210/502; 206/388; 242/163; 57/201, 202; 428/364, 377

[56] References Cited

U.S. PATENT DOCUMENTS

| | | | |
|---|---|---|---|
| 610,401 | 9/1898 | Hoffman | 206/388 |
| 1,991,847 | 2/1935 | Durgen | 210/350 |
| 3,668,118 | 6/1972 | Rhodes | 210/924 |
| 3,748,682 | 7/1973 | Rhodes | 210/924 |

*Primary Examiner*—Ivars C. Cintins
*Attorney, Agent, or Firm*—James F. Jones

[57] ABSTRACT

A product or article for manual use in the removal of spilled oil and like contaminants from the surface of a body of water is provided which is characterized by a plurality of strands of a polyolefin being placed in an endless or closed, circular state with each strand being twisted about its longitudinal axis, with the strands being retained in this state by tie or like securing means, thereby causing an intermixing of the twisted polyolefin strands with one another producing a loose, fluffy polyolefin mass having a great many interstices formed throughout the mass thereby materially increasing the adsorbing oil ensnaring characteristics of the mass. The means for tightly securing the wound and twisted strands to one another insures the retention of the imparted twist in each of the strands and also insures that the structural integrity of the formed article will be maintained thereby preventing any scattering of the strands as well as making it possible to easily achieve the removal of the article after its use from the water. The invention includes the method of making the article to insure the creation and maintenance of the twist in each of the strands that go to make up the complete article.

5 Claims, 3 Drawing Figures

POLYPROPYLENE OIL REMOVAL STRUCTURE

This is a continuation of application Ser. No. 579,907, filed May 22, 1975, now abandoned.

BACKGROUND OF THE INVENTION (A) Field of the Invention

The problem of water pollution from liquid petroleum products and like fluids having a density less than that of either fresh water or sea water has become of major concern throughout the world in recent years. Such pollution of the water results from the handling of the oil or other fluids either in transporting or storage on or near the water, which oftentimes results in accidental spillage or leakage of oil onto the water surface, as well as from the use and discharge of the fluids into the water. When such spillage, leakage, or discharge occurs, the oil must be removed as promptly as possible since the oil will tend to spread on the surface of the water and will be carried by the current of the water over great areas.

The prolonged presence of these floating petroleum products and like fluids on the water creates extremely hazardous conditions since they will deleteriously affect all forms of marine life, are quite harmful to aquatic birds utilizing the water, present a fire hazard, are malodorous to the surrounding area, and prevent the use of beach and like land areas adjacent the polluted water. While major oil spillage of the magnitude of the Torrey Canyon accident and the Santa Barbara platform oil spillage have been given considerable publicity, the day to day water pollution presents the greater problem and is caused by leakage and spillage of the oil from shore facilities adjacent the water, vessels coming into or departing from such facilities, or facilities located just off the shore. The containment and removal of oil and the like from the water in the day to day occurrence is the type of situation that is creating the major problems of pollution and is the one requiring a prompt solution or minimization of damages.

(B) Description of the Prior Art

In endeavoring to solve this serious and increasing problem of water pollution by floating oil and the like, several procedures and techniques have been heretofore proposed and employed. Examples of means heretofore employed for the general removal of the spilled oil are shown in U.S. Pat. No. 3,369,664 issued to Paul C. Dahon; U.S. Pat. No. 3,221,884 issued to Jacques Miller; U.S. Pat. No. 2,876,903 issued to Harry W. Lee; U.S. Pat. No. 2,891,672 issued to Cornelis in't Veld et al.; U.S. Pat. No. 2,330,508 issued to Eli S. McColl, and U.S. Pat. No. 3,642,140 issued to myself, James H. Parker. In addition to the mechanical means exemplified by the above patents, chemical treatments have been proposed as well as the use of hay spread over the polluted area or the burning of the oil.

More recently, there have been procedures used wherein other materials either in sheet form or strip form have been employed in the removal of the spilled oil. One such material that has been heretofore employed as an oil pick-up agent are polyolefins. Examples of such use of polyolefins, as well as other materials and agents, are shown in U.S. Pat. No. 3,146,192 to McClintock, U.S. Pat. No. 3,487,927 to Yahnke, U.S. Pat. No. 3,536,616 to Kondoh et al., U.S. Pat. No. 3,537,587 to Kain, U.S. Pat. No. 3,607,741 to Sohnius, U.S. Pat. No. 3,607,791 to Shell, U.S. Pat. No. 3,617,552 to Will et al., U.S. Pat. No. 3,617,556 to Cole, U.S. Pat. No. 3,667,608 to Burroughs et al., U.S. Pat. No. 3,668,118 to Rhodes, U.S. Pat. No. 3,669,275 to Downs, U.S. Pat. No. 3,748,682 to Rhodes, U.S. Pat. No. 3,756,948 to Weinberg, U.S. Pat. No. 3,767,571 to Lorenc et al., U.S. Pat. No. 3,770,575 to Ball, U.S. Pat. No. 3,788,984 to Teng, U.S. Pat. No. 3,810,832 to Rhodes, U.S. Pat. No. 3,812,973 to Stern.

In summation, considerable activity has been and is being devoted to the development of apparatus, systems and means to effect the removal and recovery of oil and like polluting fluids from the surface of bodies of water. There have been, as evidenced from the foregoing, a wide variety of means proposed and tried to effect the removal of oil from the surface of the water with varying degrees of success, but such means have been primarily concerned with removal of the majority of the oil from the surface of the water. However, relatively few of the previously employed means have been concerned with the substantially complete removal of residual oil remaining on the water after the bulk of the spilled oil has been removed from the water.

SUMMARY OF THE INVENTION

The present invention is concerned with the provision of a light, easily handled, loose, fluffy article or product which is manually placed upon the surface of the water containing spilled, high viscosity oil or other contaminant, and which by an adsorption action with the heavy viscous oil will entrain or ensnare the spilled oil. After the adsorption and entrainment action has been completed, the product containing the ensnared oil and with very little water included is lifted from the water surface manually by any suitable means, such as, for example, a pitchfork, boathook, or the like, and the product containing the adsorbed oil is then either discarded or subjected to a subsequent processing to recover the adsorbed and entrained oil.

The oil recovery or adsorption article or product made in accordance with the present invention comprises a plurality of narrow bands, strips, or strands of a polyolefin placed in a circular, closed state with each of the strips being twisted about its longitudinal axis. Securing means, such as, for example, a wire strand, are placed around the plurality of polyolefin strips at a single selected point to tightly secure the strands to one another and to maintain the strands in the desired twisted state, and to further insure that the structural integrity or stability of the formed article will be maintained while in use. The securing of the twisted strands in this manner results in the formation of a loose, fluffy article having a plurality of endless or closed strands of a polyolefin, with each strand being twisted about its longitudinal axis and where the strands are in an intermixed state with one another forming a large number of interstices throughout the resulting loose, fluffy mass.

The polyolefin article made in accordance with the present invention when held together by the securing means will have the endless or closed strands of polyolefin hanging down or suspended freely forming a loose, fluffy mass of endless, twisted strands which are in a highly intermixed state with one another. This construction just described results in an article having a much greater oil ensnaring area throughout the article as well as improving the inherent oil adsorption characteristics of the polyolefin strips.

The oil ensnaring and adsorption article of the present invention may be made in any desired manner. For example, an extremely simple and inexpensive method for producing the article of the present invention requires a rotatable base member having a plurality of pegs spaced around the base member at right angles thereto forming a circumferential or rectangular area generally conforming to the desired circumferential area of the article. The polyolefin strips are normally marketed in wound form on a spool and it is preferred that such forms be employed in producing the desired article of the present invention. To make the article, a free strand of the polyolefin material may be unwound from the outside of the spool and in line with the axis of the spool and wrapped around the plurality of pegs by rotating the base member containing the pegs until the desired amount of polyolefin material has been wound around the pegs. The unwinding of the polyolefin strand in this manner from the spool results in a natural twist being imparted to the individual strand of polyolefin. The twist imparted will generally correspond to one full twist per circumferential length of the strand withdrawn. In other words, for each linear distance of the polyolefin strand withdrawn which corresponds to the circumference of the polyolefin wrapped spool, such length of strand will have one full, longitudinal twist.

It is to be noted that the article may be made by unwinding the polyolefin strands from a single spool or a plurality of spools, with a strand from each being wound around the pegs. The desirability of the use of a plurality of spools is primarily based on speed of production. The amount of polyolefin material to be wound on the pegs, as hereinbefore indicated, is dependent upon the weight or bulk that the article or product is to possess.

After the desired amount of polyolefin strands have been wound on the pegs of the rotatable base member, the loose ends of the single strand in the case of a single spool, or the loose ends of each of the strands in the case of the use of a plurality of spools, are placed in overlapping or side by side relationship at one selected point forming a securing or tie section. Securing means, such as, for example, a tie wire, is then wrapped tightly around the formed tie section of the endless strands to secure the strands to one another so tightly that the strands will remain in a twisted state when the article is in use and the structural stability of the article at all times will be insured. The portion of the loose strands on either side of the tie section may then be cut, if desired, forming a very small cut portion on either side of the section, with the remainder of the polyolefin strands being maintained in an endless state forming the desired closed area. The formed polyolefin article mass is then withdrawn from the base member thus forming a loose, fluffy product which is capable of ensnaring a considerable amount of heavy viscous oil from the surface of a body of water when used in a manner to be described more fully hereinafter.

In the foregoing description, the strands to be employed in producing the desired article have been defined as being polyolefin strands. This term is intended to include any polyolefin capable of forming a lightweight entangled mass and which is capable of adsorbing the heavy viscous oil. The preferred polyolefin to be employed in the present invention is polypropylene although polyethylene strands may be employed, if desired. In the ensuing description, reference will be had only to polypropylene strands, but it is to be noted that such reference is intended to include polyolefin strands in general.

DESCRIPTION OF SPECIFIC AND ILLUSTRATIVE EMBODIMENT

Figure 1:
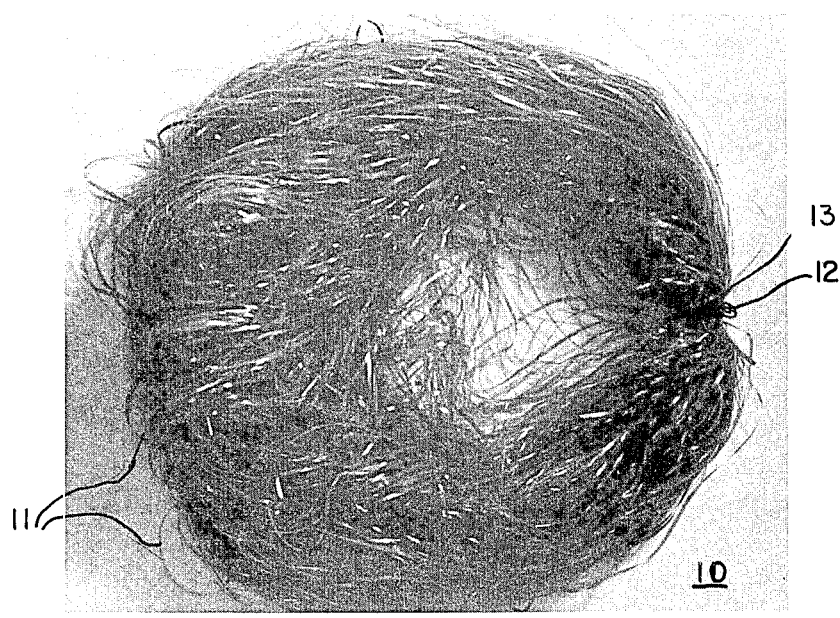
FIG. 1 is a pictorial top view of an illustrative embodiment of an oil ensnaring and adsorption article made in accordance with the present invention with the article placed in a laid out, open state.
Figure 2:
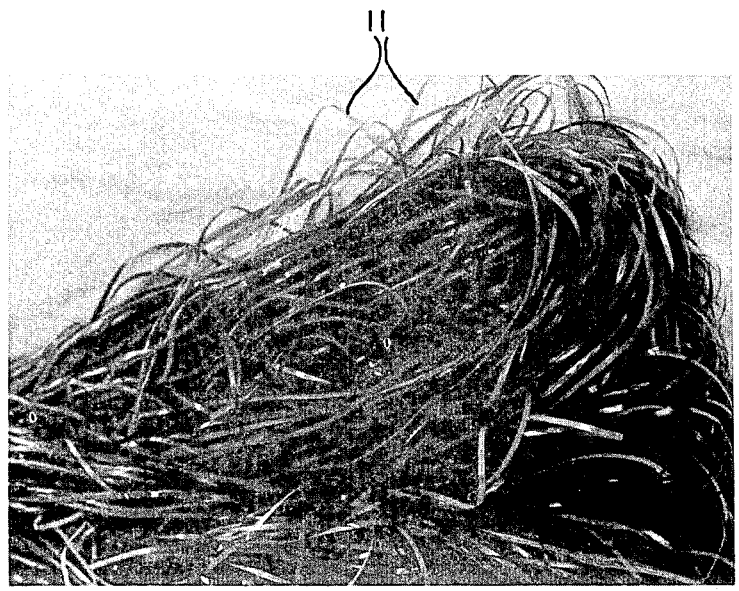
FIG. 2 is a pictorial top view of an enlarged portion of the article shown in FIG. 1 illustrating the intermingling of the strands with one another by which the many interstices are formed.
Figure 3:
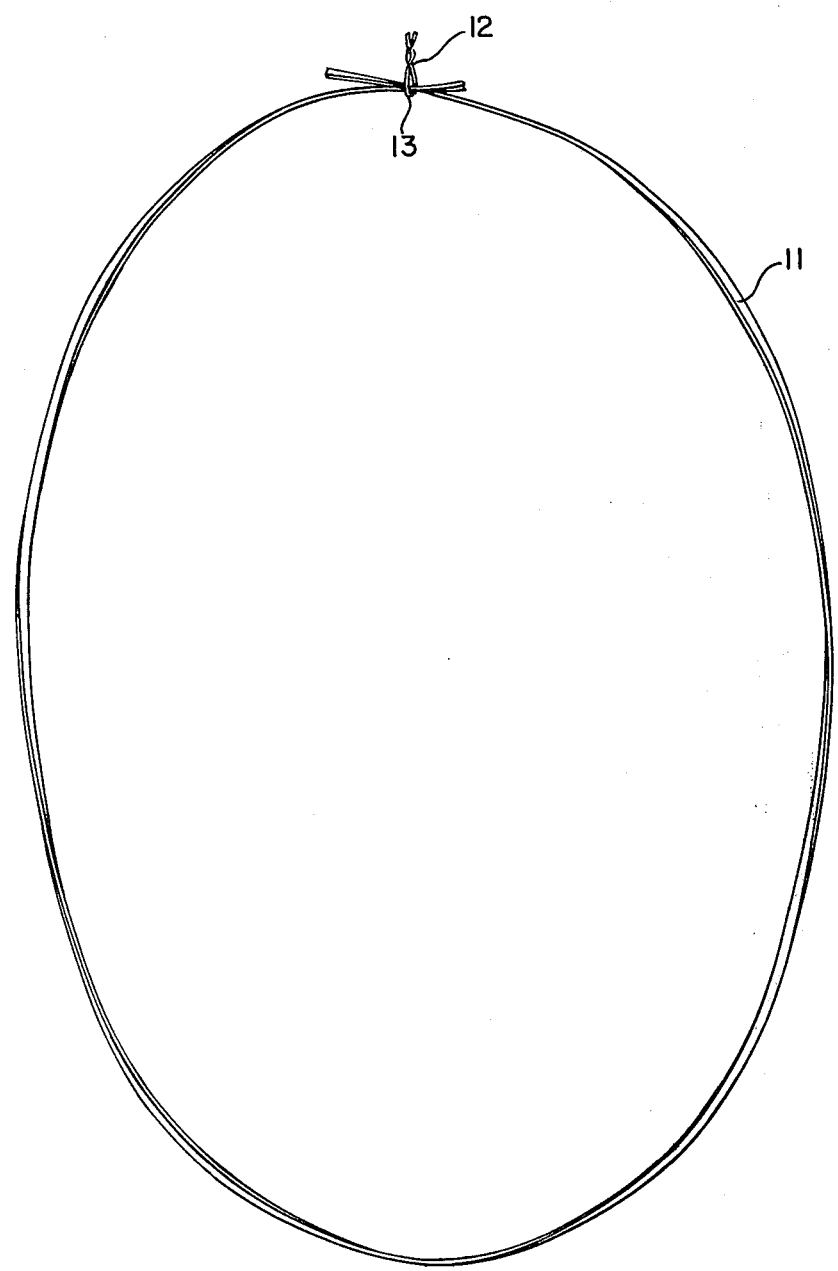
FIG. 3 is an enlarged front elevation of a single polyolefin strand used to form a single loop in accordance with the present invention and illustrating the axial twisting of the strand and the tying of the loose ends of the strand to one another to form the endless loop.

Reference is now to be had to FIGS. 1-3 wherein an oil ensnaring and oil adsorption product or article made in accordance with the present invention for use on heavy viscous oil, such as Bunker C Oil, and generally designated by reference numeral 10 is shown. The product or article comprises a plurality of polypropylene strands 11 which are twisted about their respective longitudinal axes and are in an encircled or looped position forming a plurality of strands in an endless or closed state. The polypropylene strands 11 in the encircled or endless state are secured to one another by a tie wire 12 secured around the longitudinal axis of the mass of strands 11 in tight encircling relationship forming a tie portion 13. The tie portion 13 has loose ends of the polypropylene strands 11 on either side of the tie wire 12 and such free ends are cut forming very short, loose ends, with the remainder of the strands 11 forming the closed or encircled loop of the article 10. The article 10 as shown is in a loose, fluffy state with the strands 11 being intermixed with one another forming a large number of interstices.

The polypropylene strands 11 forming the closed loop, as hereinbefore indicated, are each twisted with respect to the longitudinal axis of each strand. The degree or amount of twist of the strands 11 may vary depending upon the manner and mode employed in producing the product 10. The degree of twist of the strands 11, however, must be sufficient to ensure the intermixing formation of a loose mass of intermixed strands containing a large number of interstices, thereby enhancing the ensnaring or entrapping action of the strands as a whole for the viscous oil to be picked up.

As shown, the tie wire 12 is a single strand of wire that has been wrapped in encircling relationship around the aligned free ends of the strands 11 at the tie portion 13 in a very tight relationship. The tightening of the wire 12 around the tie portion 13 may be increased by twisting the free ends of the wire around one another. This action will result in the individual strands 11 of the product 10 being maintained in a permanent twisted state which is desirable in order for the formed article to achieve the desired oil adsorption and ensnaring action necessary for the removal of the viscous oil and to also maintain its structural integrity.

The polypropylene to be employed in the production of the article 10 is any suitable thin gauge narrow strip of polypropylene. The gauge of the polypropylene strips will generally be in the range of ½ mil to 5 mils, with the preferred gauge being 2 mils. The width of the polypropylene strips to be employed in the production of the article 10 may be from 20 mils to 500 mils and preferably 80 mils to 120 mils, and preferably 100 mils.

The diameter of the formed closed or endless loop of the article or product 10 may be of any dimension which will insure the production of the intermixed mass of longitudinally twisted strands 11 in the product 10 by which the desired oil ensnaring and adsorption objects of the present invention are achieved. A principal factor entering into the diameter of the formed loop of the polypropylene product 10 is the desire for ease of use of the product. The diameter should be such that the article 10 can be readily handled manually by a worker when the article is loaded with the heavy viscous oil. For example, an oil ensnaring and adsorbing product formed with a too large diameter would be, after ensnaring and adsorbing the viscous oil, so heavy that the manual lifting of the oil soaked mass would be virtually impossible. A second deterrent to producing a product having an excessive diameter for the article is that the degree of entangling of the strands with the resulting formation of the interstices therein within which the spilled oil will be ensnared is materially diminished. As a result, the physical size of the article 10 should be such that the article, after being used to pick up the heavy residual viscous oil, can be readily removed from the surface by one or two men using a pitchfork, boathook, or the like to lift the oil soaked mass from the water.

Another factor that must be considered in the production of the article 10 is the amount of polypropylene to be employed. In general, the amount of polypropylene to be employed is that which is sufficient to produce a product of dimensional size that will permit the desired oil pick-up and can be readily removed from the water after use, as hereinbefore indicated. In general, it has been found that strands of polypropylene producing a product weighing from $\frac{3}{8}$ to $\frac{3}{4}$ lbs. can be employed, with the preferred amount being about $\frac{1}{2}$ lb. However, it must be emphasized that such weight and dimensional size can be greater than these values if the desired interstices and intermixing of the strands is achieved and the necessary heavy equipment is available to lift a large and heavy oil laden mass.

The article or product 10 possessing the foregoing structure has, as hereinbefore indicated, a plurality of polypropylene strands in a twisted state hanging loosely and in an intermixing state when the article 10 is permitted to hang loose. This twisted and intermixed state of the polypropylene strands 11 results in the formation of a large mass of interstices within the polypropylene article 10 which function to ensnare or entrap the spilled oil by filling the formed interstices. This ensnaring action within the formed interstices of the product 10 coupled with the normal oil affinity characteristics of the polypropylene results in the ensnaring and adsorption of a greater amount of spilled oil than a comparable amount of polypropylene material in a normal state would otherwise take up. In actual use, a polypropylene article made in accordance with the present invention and weighing $\frac{1}{2}$ lb. has increased its weight by from 10 lbs. to 30 lbs. when used on a Bunker C oil spill.

Thus, the polypropylene product or article 10 is one that is extremely simple in design, cheap in cost, and is easily used. Moreover, its structure does not permit scattering of the polypropylene and the article maintains its structural integrity when in use. Furthermore, the article 10 is of such a relatively low cost that after use it may be discarded or otherwise disposed of at very little loss. However, if it is desired to recover the oil, the polypropylene product 10 containing the picked up oil may be processed easily by pressing, heating, washing, or by any other known means to remove the oil and thus permitting a reuse of the product 10.

In the preparation of the article 10 of the present invention, the preferred method involves mounting a plurality of spools of polypropylene, such as, for example, 30 to 40 spools, upright on spindles mounted on a work table. A strand is drawn upwardly from the top outside end of each spool and fed upwardly through a guide element and then down to the winding mechanism. The winding mechanism includes an upstanding or vertical support having a horizontally disposed shaft element centrally mounted therein. A base member is centrally mounted in rotatable relationship on the free end of the shaft and a motor is provided for rotating the base member in a vertical plane. The outside face of the base member is provided with a plurality of horizontally disposed pins of any desired number, such as, for example, 4, extending outwardly therefrom and will function as the means on which the polypropylene strands will be wound.

The free end of each spool of polypropylene is affixed to the same peg on the base member and the drive motor is started to rotate the base member. This action will result in the individual strands of polypropylene being withdrawn from its respective spool and wrapped around the pegs. The rotation of the base element is continued until a sufficient amount of the polypropylene strands on a weight basis has been withdrawn at which point the rotation of the base element is discontinued.

The withdrawing of the polypropylene strands from the spools in the manner just described will cause an inherent twisting of the strands about their long axis, with the amount of twist being generally determined, as hereinbefore indicated, by the size or circumference of the spool. Thus, when the polypropylene strands are wrapped around the pegs, the wrapped strands will contain the inherently imparted twist which is necessary and essential for the article or product 10 when completed, if it is to function in its intended manner. Care must be exercised to insure that the imparted twist will remain in each of the strands throughout the life of the article.

To tie the polypropylene strands to form the article, the two free ends of each of the wound multiple polypropylene strands are placed in overlapping or side by side relationship with one another to form a tie joint or section and a tie wire or other securing means is tightly wrapped around the tie joint so as to maintain the wound strands in a tightly secured and twisted state. The tying operation may be done by mechanical means to insure the proper tying of the individual strands. While it is preferred that the loose ends of the strands be secured by means of a tie wire, it is to be understood that other securing means, such as, for example, clamping means, may be used. It is also possible to secure the base ends by welding. The formed article is then removed from the pegs of the support member.

The article or product 10 formed in this manner is a loose, fluffy mass which contains a large number of individual polypropylene strands which are in a twisted state about their longitudinal axis which has a closed or endless configuration, with the strands being intermixed with one another forming a great many interstices within and through the entire mass. Thus, when the article 10 is thrown onto the surface of the body of water containing the heavy viscous oil, a considerable amount of the oil will be retained within the formed interstices in addition to the amount of oil the polypropylene strands would otherwise normally take up. Thus, the article 10 by its structure makes it possible to take up considerably more oil with a given amount of polypropylene than heretofore possible.

The article 10 made in accordance with the present invention, as hereinbefore indicated, is of primary utility with heavy viscous oil as distinct from light oils. The article will be of particular utility in the cleaning up of the residual oil remaining after the bulk of the spilled oil has been removed. However, it is to be understood that the article of the present invention may be employed as the sole pick-up agent for small spills. To use the article 10 in the removal of viscous oil, a number of the formed articles are placed on the contaminated surface. The articles are permitted to remain in this state for a short time to achieve a brief soaking thereof. Each article 10 is thereafter pushed down manually by means of a suitable tool through the surface of the spilled oil and then drawn upwardly clear of the oil. This dunking operation is repeated for each article until each article has increased in weight to about the maximum that the operator can conveniently handle. Each of the oil engulfed articles is then disposed of or is cleaned and ready for reuse.

While there have been described herein what are at present considered preferred embodiments of the invention, it will be obvious to those skilled in the art that modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

I claim:

1. A loose, fluffy polyolefin article for manual use in the pick-up of viscous oil comprising a plurality of intermixed strands of polyolefin in encircling, closed relationship, each of said strands being twisted about its longitudinal axis causing an intermixing of said strands with one another forming a large number of interstices throughout the formed article and securing means fixedly tied in tight relationship around said strands at only one point to maintain said strands in a twisted and closed state and thereby insuring the intermixing of the strands with one another.

2. An article in accordance with claim 1, wherein the polyolefin strands have a gauge of $\frac{1}{2}$ mil to 5 mils and a width of 20 mils to 500 mils.

3. An article in accordance with claim 1, wherein the polyolefin strands have a gauge of 2 mils and a width of 80 mils to 120 mils.

4. An article in accordance with claim 1, wherein the weight of the article in an unused state is in the range of $\frac{3}{8}$ lb. to $\frac{3}{4}$ lb.

5. An article in accordance with claim 1, wherein the polyolefin is polypropylene.

* * * * *